United States Patent [19]
Schaeffer et al.

[11] 3,775,008
[45] Nov. 27, 1973

[54] OPTICAL SCANNING APPARATUS

[75] Inventors: Robert A. Schaeffer; William T. White, both of Rochester; Samuel D. Coriale, Webster, all of N.Y.

[73] Assignee: Xerox Corporation, Rochester, N.Y.

[22] Filed: Aug. 25, 1971

[21] Appl. No.: 174,946

Related U.S. Application Data
[62] Division of Ser. No. 859,929, Sept. 22, 1969.

[52] U.S. Cl. .......................... 355/18, 355/8, 355/25, 355/64, 355/82
[51] Int. Cl. ............................................ G03b 27/16
[58] Field of Search ...................... 355/8, 47, 82, 64, 355/65, 18

[56] References Cited
UNITED STATES PATENTS
3,512,886 5/1970 Wirley ............................. 355/8 X
2,357,827 9/1944 Hopkins ............................. 355/47
3,092,004 6/1963 Lewis ................................ 355/82

Primary Examiner—John M. Horan
Attorney—Paul M. Enlow et al.

[57] ABSTRACT

An optical system is disclosed herein for scanning a stationary original and placing a flowing light image thereof upon a moving light receiving member. The original is placed upon a light transmitting platen and successive incremental areas thereon scanned by means of a moving lamp and a moving lens which cooperate to focus a flowing image of the original on the moving surface in synchronous timed relation therewith. A shutter is positioned adjacent to the optical path and is arranged to move into a light blocking position to prevent exposure of the photosensitive surface when said surface is not in motion.

3 Claims, 12 Drawing Figures

PATENTED NOV 27 1973 3,775,008

OPTICAL SCANNING APPARATUS

This is a division of application, Ser. No. 859,929 filed Sept. 22, 1969.

This invention relates to an optical scanning system and, in particular, to apparatus for placing a flowing light image of a stationary original upon a moving photosensitive surface.

It has always been desirous in automatic xerographic reproducing machines to hold the original object to be reproduced upon a stationary, preferably flat, platen while an image of the original is reproduced upon a light sensitive member such as a rotating xerographic drum. The stationary platen provides a safe, convenient, platform upon which a wide variety of objects such as copy sheets, books, or three dimensional forms of any number of shapes and sizes can be supported in a plane. The stationary platen also affords a wide freedom of control over the composition of the original wherein subject matter from many different sources can be formulated into a single composite which is then easily reproduced.

These many advantages associated with the flat support platen, however, were never fully realized until Mayo, in U.S. Pat. No. 3,062,094, disclosed a moving scanning apparatus by which a flowing light image could be placed in synchronous timed relation with a moving light receiving surface to produce a non-distorted image of the original. Since the Mayo invention, the copying art, and in particular the xerographic art, has made many sigificant advances in process and materials. High speed, sensitive, photoreceptors are now available making it possible to reproduce images of originals during extremely short exposure periods. Although the Mayo device has met with wide commerical success, it nevertheless has been found to have certain limitations when used in high speed machines of this type.

It is therefore an object of this invention to improve optical scanning apparatus for placing a flowing light image of a stationary original upon a moving photosensitive member.

A further object of this invention is to improve xerographic scanning apparatus by preventing ambient light from passing through the scanning system and overexposing the photoconductive member during periods when the photoconductive member is not in use.

A still further object of this invention is to provide an optical scanning system for placing a flowing light image of a stationary original on a moving photosensitive surface for use in high speed automatic xerographic reproducing apparatus.

A still further object of this invention is to improve automatic xerography by reducing the amount of wasted machine time between copying cycles.

Yet another object of this invention is to provide a moving scanning apparatus in which the scanning mechanism is returned at a more rapid rate than the scanning rate reciprocating cycle of the elements.

These and other objects of the present invention are attained by means of a scanning system having a stationary platen for supporting an original to be copied, a source of illumination relation in a movable carriage and being arranged to illuminate incremental bands upon an original supported upon the platen, a moving light receiving member positioned to receive reflected light images from an original on the platen surface, a movable lens interposed between the moving light reciving member and the source of illumination for focusing illuminated areas on the copyboard onto the reciving member, means to drive the lens and the lamp carriage along their respective individual paths of travel at predetermined rates in relation to the light receiving surface wherein a flowing light image is placed on the moving surface, means to return the lens and lamp carriage to their respective starting position at a rate in excess of the predetermined scanning rate, and light blocking means positioned adjacent to the optical path and being arranged to move into light blocking relation therewith when the light receiving member is not in motion.

For a better understanding of the invention as well as other objects and features thereof, reference is had to the following detailed description of the invention to be read in connection with the accompanying drawings, wherein.

Figure 1:
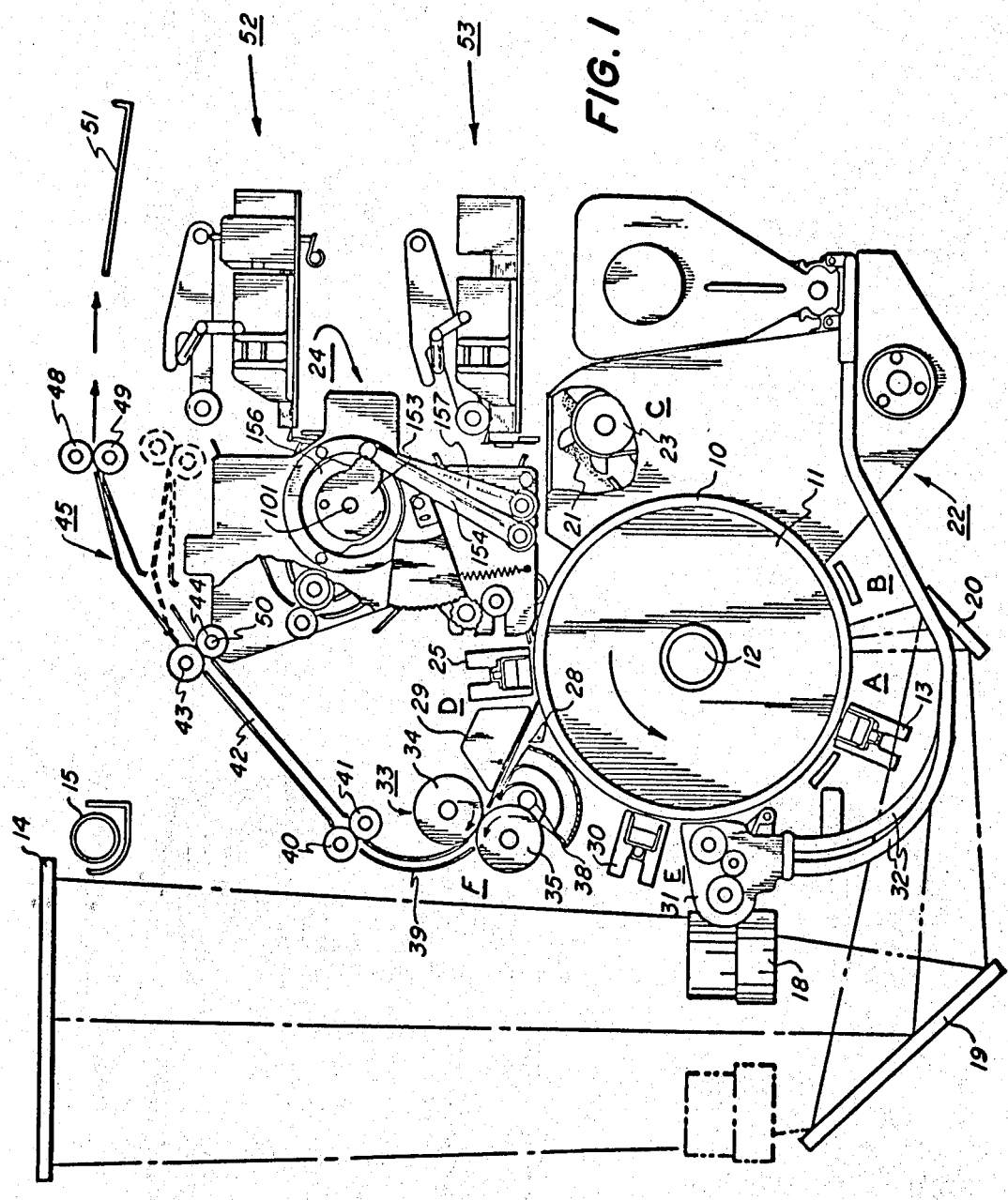
FIG. 1 is a schematic side elevation of an automatic xerographic machine utilizing the present apparatus.

As illustrated in FIG. 1, the apparatus of the present invention is shown herein embodied in an automatic xerographic reproducing machine capable of producing both simplexed or duplexed copy. Although the apparatus of the present invention is particularly well adapted for use in automatic xerographic machines, it should become evident from the discussion below that it is equally well adapted for use in a wide variety of apparatus and is not necessarily limited in its application to the particular embodiment shown herein.

The automatic xerographic apparatus illustrated in FIG. 1 includes a photosensitive plate having a photoconductive layer 10 placed over a conductive backing and the plate formed in the shape of a drum 11. The xerographic drum is mounted upon a shaft 12 and the shaft journaled for rotation within the frame of the machine. Basically, the xerographic drum is rotated in the direction indicated so as to pass sequentially through a series of xerographic processing stations. The drum surface and the other machine operating mechanisms are driven at a predetermined speed relative to each other from a single drive system (not shown) and the operations coordinated in order to produce proper co-operation of the various processing stations.

An original, such as a document, book, or the like, is placed upon a transparent platen 14 and the original scanned by a moving optical scanning system to produce a flowing light image thereof. Fundamentally, the scanning system includes a single aperture lamp 15 and a lens element 18 arranged to move in individual paths to transverse the plane of the platen. As will be explained below, the scanning rates of the lamp and lens are controlled wherein a flowing light image is placed in an undistorted manner upon the moving drum surface. The optical path of the system is folded by means of a pair of image mirrors 19 and 20 so that the light image is placed on the bottom of the drum surface at exposure station B. Prior to the imaging of the drum surface, however, the photoconductive drum surface is uniformly charged by means of a corotron 13 positioned in charging station A. Under the influence of the flowing light image, the uniform charge is selectively discharged in the non-imaged areas whereby a latent electrostatic image of the original is produced on the drum surface.

The latent image is next transported on the drum through a developer housing 22 located in a developing station C where the charged drum surface is treated with a developer material 21 possessing charged toner particles having a polarity opposite to that of the latent electrostatic image. A supply of developer material is supported in the bottom of the developer housing and is delivered to an elevated entrance to the development zone by means of a bucket conveyor system 23. The developer material 21 is caused to flow downwardly in contact with the upwardly moving drum surface under controlled conditions wherein charged toner particles are attracted into the image areas thus making the image visible.

The moving drum surface next transports the developed image to a transfer station D where a cut sheet of final support material, as for example, paper, is moved from either upper supply tray 52 or lower supply tray 53 through the sheet registration mechanism 24 into coordinated synchronous moving contact with the image on the drum surface. The backside of the copy sheet is sprayed with an ion discharge from a tranfer corotron 24 inducing a charge thereon of a polarity and magnitude sufficient to attract the toner material from the drum surface to the final support material. The sheet is then stripped from the drum surface by means of stripper finger 28 and directed into contact with a stationary vacuum sheet transport 29.

Although a preponderance of the toner material is transferred to the copy sheet, invariably some residual toner is left behind on the drum surface after image transfer. This residual toner is removed from the drum as it moves through cleaning station E. Here the residual toner is first brought under the influence of a cleaning corotron 30 adapted to neutralize the electrostatic charge remaining on the toner material. The neutralized toner is then mechanically cleaned from the drum surface and collected within a housing 31. A conveyor system, moving through an endless path through guide tubes 32, transports the collected residual toner back into the developing station where it can be once again used in the xerographic developing process.

Simultaneously, with the cleaning operation, the image bearing support material is moved along sheet transport 29 into a fusing station F where the sheet passes between upper fuser roll 34 and lower roll 35 making up fuser assembly 33. The two rolls are mounted in operative relation so that the roll coact to support a sheet of material in pressure driving contact therebetween. The outer surface of the lower roll is heated by means of a horizontally arranged elongated radiant heat source 38 that is positioned in close proximity to the roll surface adjacent to the point at which the roll contacts the image bearing support material. As the heated roll is rotated in the direction indicated, the hot roll surface is pressed into intimate contact with the image bearing material. Sufficient mechanical and heat energy is rapidly transferred in the contact zone to the sheet to fuse the toner particles to the final support material.

The now fixed copy sheet is passed through a curvalinear sheet guide 39 into cooperating advancing rolls 40, 41 which cooperate to forward the sheet through a linear sheet guide 42. A second pair of advancing rolls 43, 44 further forward the sheet into a movable sheet guide system generally referenced 45. As shown in FIG. 1, the movable sheet guide system 45 and its associated advancing rolls 48, 49 are pivotally mounted about shaft 50; the guide being positonable to direct a copy sheet into either catch tray 51 or upper supply tray 52. A mode of operation is provided, by which a simplexed copy sheet can be stored in the upper supply tray and refed through the xerographic processing stations to place a second image on the opposite side thereof.

It is believed that the foregoing description is sufficient for purposes of the present application to show the general operation of a xerographic reproducing machine embodying the teachings of the present invention.

Referring now to the specific subject matter of the present invention, illustrated in FIG. 2–12 the preferred embodiment of the exposure mechanism of this apparatus is designed to use a moving optical scanning or projection assembly to scan the object to be reproduced and to project a flowing light image thereof onto the surface of the rotating light sensitive drum. The length of scan and the projection of the image of the object onto the surface of the drum is timed relation with the movement of the drum is controlled by the scan mechanism which will be explained in greater detail below. The optical scanning of the object, which is placed upon the fixed platen 14, is accomplished by means of a movable lens system. The lens element is arranged to move in a path transverse to the plane of the platen in predetermined timed relation with the drum surface to scan an original supported thereon. Although any suitable source of illumination can be employed to illuminate the original on the platen, in this preferred embodiment of the invention there is provided a lamp carriage supporting a single elongated glow discharge tube being capable of projecting an incremental band of illumination forward of said carriage in the direction of scan. The lamp is also arranged to move in a path transverse to the platen in timed relation with the moving photosensitive plate. The moving lamp bands projects successive bands of illumination which results in a uniform illumination of the object supported thereon.

A pair of fixed image mirrors mounted below the lens and the drum surface reflect the light image transmitted by the lens through an aperture slit 111 positioned adjacent to the drum onto the bottom surface of said drum.

In order to conserve valuable machine time in a high speed automatic reproducing machine of the type herein disclosed, it is essential that the time to restore both the lamp and the lens elements to their respective start of scan positions be reduced to a minimum. It has been found that conventional spring return means, as described in the previously cited Mayo patent, returns a lens or lamp at high speeds which induces stresses in the associated mechanisms of a magnitude sufficient to damage the lamp and lens elements. In the present invention, both the lamp carriage and the movable lens element are positively driven during the scanning phase and the return phase of the copying cycles by their respective control mechanisms.

Figure 2:
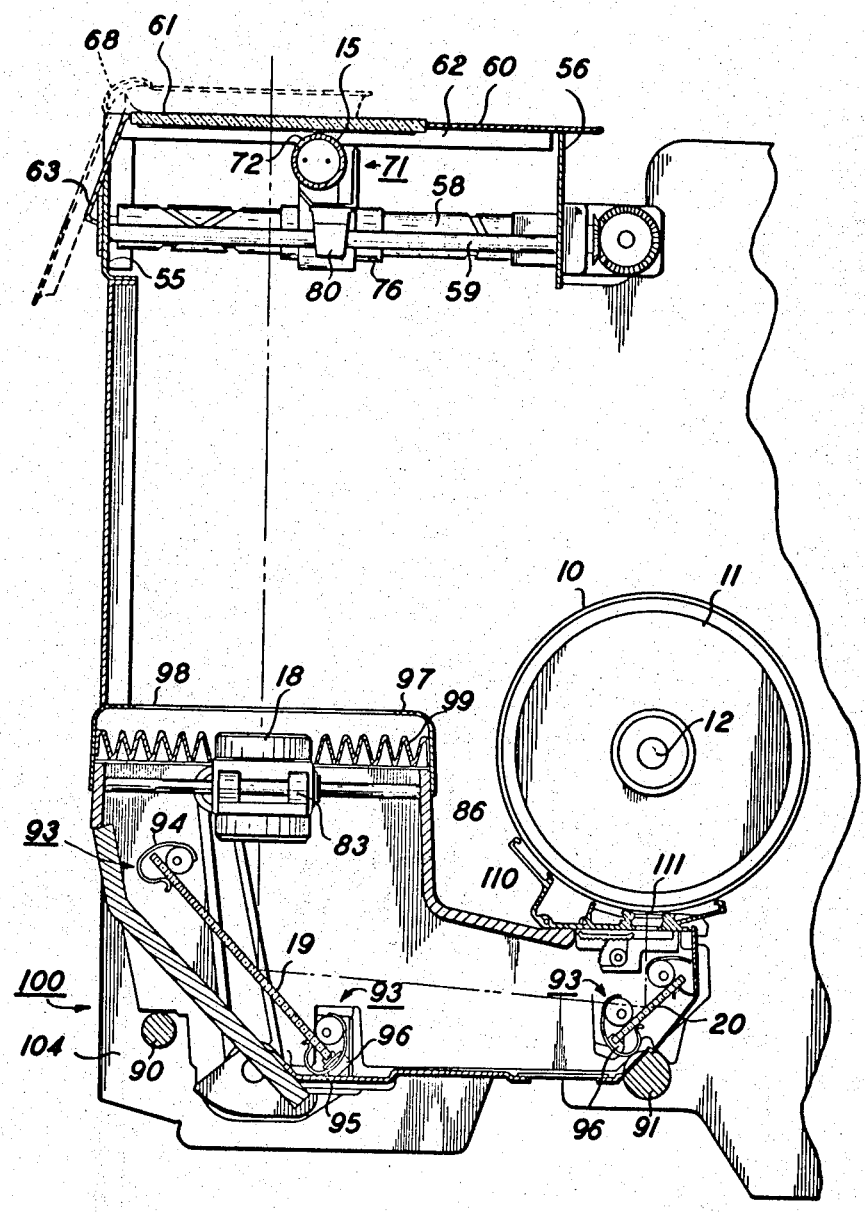
FIG. 2 is a partial side elevation in section showing the optical scanning mechanism of the instant invention.
Figure 6:
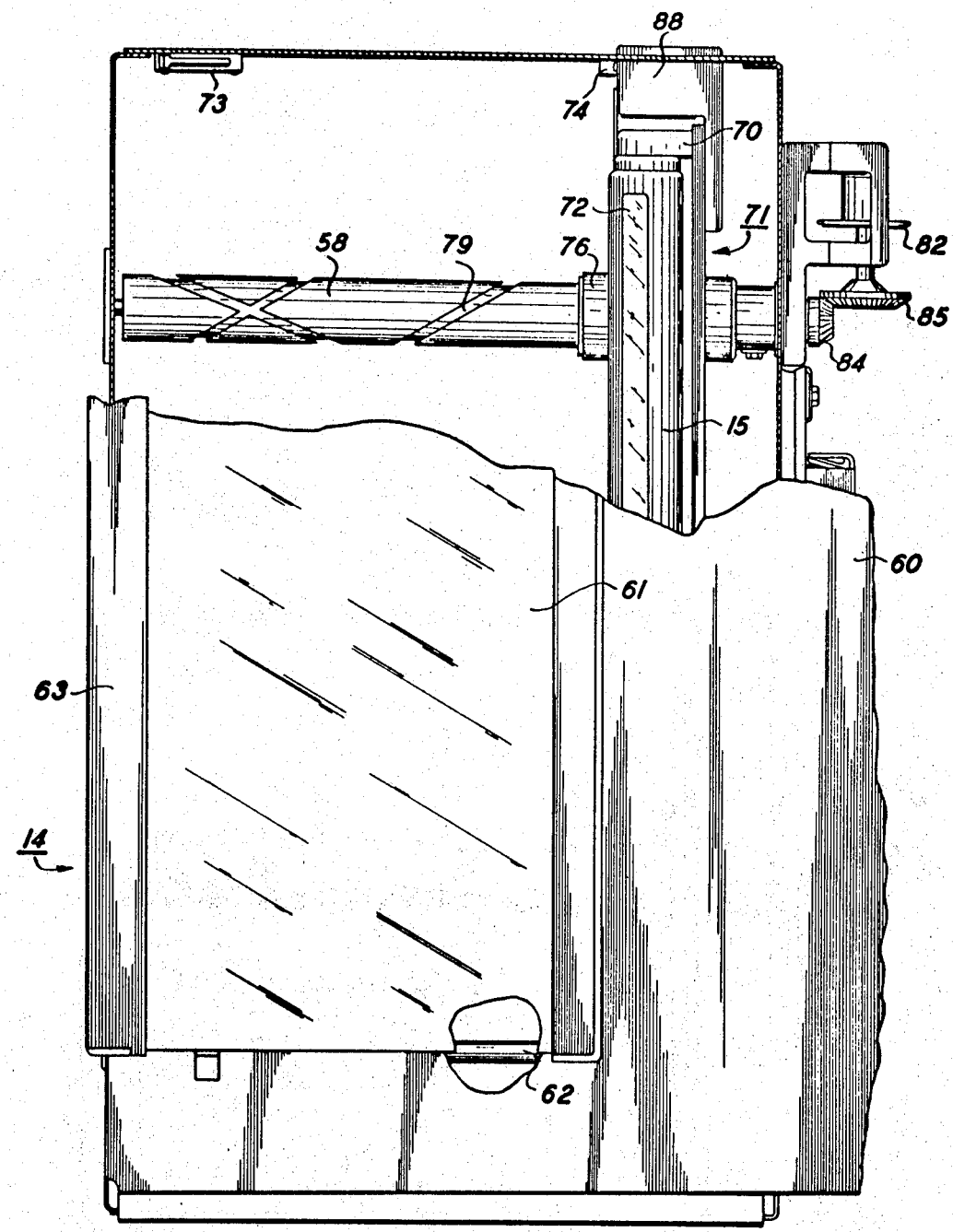
FIG. 6 is a partial plan view with portion broken away of the support platen and the lamp drive mechanism
Figure 7:
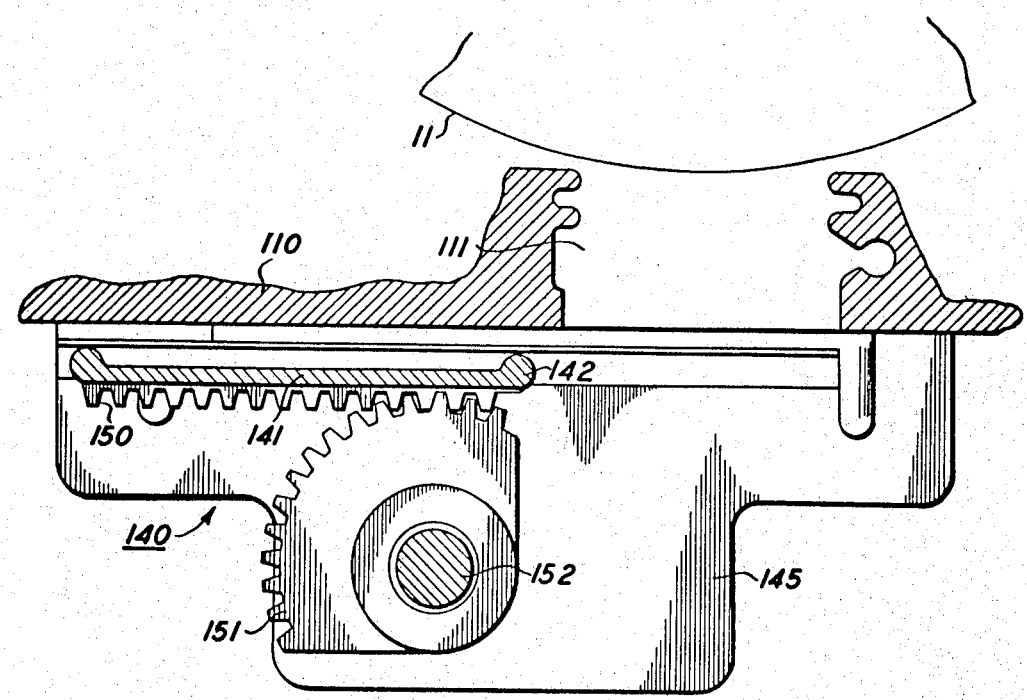
FIG. 7 is an enlarged side elevation in section showing the shutter slide and associated drive mechanism.

The optical scanning assembly employed to project a light image of a stationary original onto the moving photosensitive surface of rotating drum 11 include side plates 55 and 56 which may be formed integrally with the main machine frame or, optionally, as illustrated in FIGS. 2 and 6, as separate plates bolted or otherwise secured to the main frame of the machine. The two side plates are connected together in fixed parallel relation to each other and support therebetween the lamp carriage drive shaft 58 and the lamp carriage support rod 59.

Stationary platen 14 is mounted in a suitable receiving opening in the top cover plate 60 of the machine as illustrated in FIG. 2. The copyboard consists of a light transmitting surface 61, usually constructed of optically clear glass, which is supported upon a mounting frame 62 and the frame secured to underside of the top cover plate. The platen is securely supported on three sides in the frame while the remaining side, that is, the left-hand side as shown in FIG. 2, held suspended at the edge of the main machine frame. An inclined member 63, which is affixed to left-hand side plate 55, is held in abutment with the suspended edge of the platen and therewith to provide a continuous angulated surface upon which a bound original, such as a book, magazine, or the like, may be conveniently supported in a non-damaging posture during exposure. A book 68 illustrated by dotted lines, is shown supported on the platen in FIG. 2. Although not shown, a suitable platen cover capable of both protecting the top surface of the platen and holding an original in intimate contact therewith, is hinged upon one edge of frame 62.

In a high speed xerographic reproducing apparatus as herein disclosed, a highly sensitive photoconductive plate, that is, a plate which is extremely fast in both a photographic and a xerographic sense, is required in order to completely expose the plate during the relatively short exposure period. Because of the plate sensitivity, an illumination source of relatively low intensity can be employed in the present apparatus. For this purpose, there is provided a lamp carriage 71 movably supported between the lamp carriage drive shaft 58 and the lamp carriage support rod 59 and being arranged to reciprocally drive an elongated light source 15 along a path of travel transverse to the platen.

Figure 12:
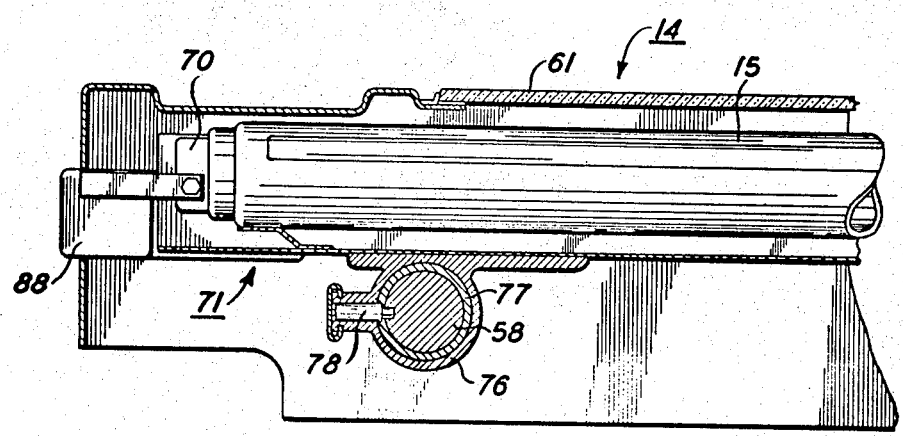
FIG. 12 is a partial section taken along lines 12—12 in FIG. 6 showing the lamp drive mechanism.

As illustrated in FIG. 2, 6 and 12, the lamp carriage 71 is substantially L-Shaped along the major portion of its length and has a pair of electrical adapters 70 mounted in vertical parallel relationship at opposite ends of the carriage capable of supporting a source of illumination therebetween. In the preferred embodiment, the lamp adapters are arranged to support a single, elongated tubular fluorescent-type lamp beneath the support platen with the axial centerline of the lamp in parallel relation with the platen surface. The outer surface of the lamp is generally opaque with a light transmitting slit aperture 72 formed therein which extends longitudinally across the surface of the lamp. To energize the lamp, the lamp adapters are electrically connected to a suitable source of energy (not shown) by means of a flexible cable.

Figure 10:
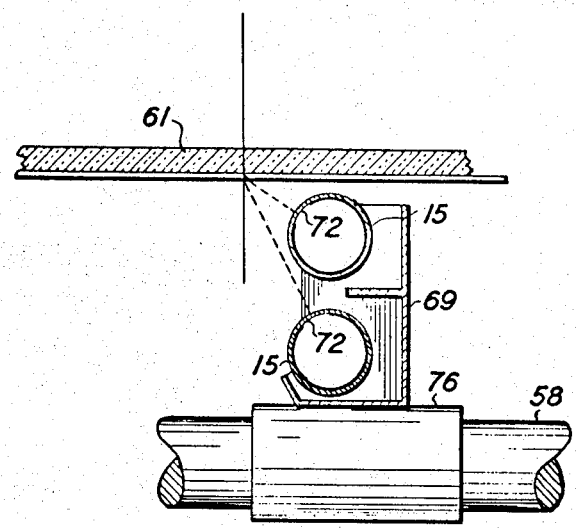
FIG. 10 is a side elevation of an alternate embodiment of the lamp carriage shown in FIG. 2.

Often times it will be physically impossible to position the illumination source in close proximity to the platen surface in the manner disclosed in this preferred embodiment of the present invention. It is well known that the intensity of illumination drops off rapdily the further the source is moved from the irradiated body. It is therefore quite feasible that more than one illumination source will be needed to produce the required illumination at the platen surface. An alternate embodiment of the lamp carriage is shown in FIG. 10 in which two vertically aligned lamps 15 similar to the lamp herein disclosed are supported in the lamp carriage 69. The elongated slit apertures 72 associated with the lamps are arranged to focus upon a single incremental area on the platen, the area being forward of the lamp carriage in the direction of scan. As can be seen, by mounting the lamps in this manner, a wide flexibility and placement of the lamp carriage is afforded without departing from the teachings of the present invention.

A switching arrangement is provided to control the energy source wherein the lamp is energized at the start of a scanning portion of the copying cycle and held energized for a period of time sufficient to allow the lamp to sweep across the entire surface of the platen. However, as the carriage returns to the start of scan position, the power to the lamp is reduced to a level below the threshold potential of the lamp to hold the lamp inactive during the return pass. A pair of limit switches 73 and 74 are affixed to the machine frame with their respective actuating arms positioned in interferring relationship with a portion of the lamp carriage. As the clamp carriage starts forward in the direction of scan, the contact of limit switch 73 is closed allowing current to flow from the electrical source to the lamp. Upon completion of the pass, the contact of limit switch 74 is made sending a signal to the energy source reducing the available potential at the lamp to just below threshold. In this manner, the amount of illumination passed through the optical system on to the sensitive plate is minimized to prevent overexposure of the drum.

As illustrated in FIG. 2, the elongated light transmitting aperture 72 in the lamp is positioned to project a band of illumination well forward of the lamp carriage in the direction of scan. As the lamp is moved from left to right as shown in FIG. 6. the band of illumination moves across the platen into the corner formed by the unsupported edge of the platen and the inclined machine member 63. As can be seen, the present arrangement gives the scanning apparatus the ability to look into corners or otherwise inaccessible areas.

A dependent bearing housing 76 is provided at the right-hand end of the lamp carriage in which is mounted in a journal bearing 77 (FIG. 12) and the bearing arranged to ride upon the rotatably supported drive shaft 68. A pin 78 passes through both the housing and the bearing in an opening provided and rides freely in a helix groove 79 formed in the shaft. The shaft extends through plate 56 and is operatively connected by means of a pair of spiral bevel gears 84 and 85 to drive sprocket 82 locked to the main drive system. In this manner, the movement of the lamp carriage is coordinated in timed relation with the movement of the drum surface and the lens element.

Another dependent bearing housing 80 is formed in the opposite end of the lamp carriage having an internal bearing surface adapted to ride upon support rod 59. Both the rod and bearing surface are constructed of a plastic material, such as nylon, polyethylene, teraphthalate or tetrafluorethylene having a low coefficient of friction and which exhibits good tensil strength and wear properties at room temperature. The drive shaft is also constructed of a similar material to facilitate the free movement of the carriage back and forth along its predetermined path of travel.

As the drive rod is rotated in the manner described above, the helix groove therein acts against stationarily held pin 78 driving the lamp carriage along its path of travel below the platen. The helix groove 79 is, in effect, a cylindrical cam which imparts a prescribed motion to the lamp carriage. At the start of a scanning cycle, the cam causes the carriage to first rapidly accelerate to the scanning velocity. A linear motion is then translated to the carriage driving the lamp across the platen at a uniform rate during the scanning pass. At the end of the scanning pass, the carriage is rapidly decelerated to a zero velocity and the direction of travel reversed. A rapid but harmonic return motion is imparted from the cylindrical cam to the carriage causing the carriage to rapidly accelerate and then decelerate to a zero velocity during the return phase of the copying cycle. To minimize wasted machine time between scanning passes, the carriage is restored to the start of scan position, a distance of approximately 10 inches, in about 8.5 seconds.

The forces generated during these extremely short acceleration and deceleration periods and return phase of the copying cycle are relatively high. Because the lamp is extended some distance in a horizontal direction from the drive shaft, a high torque is generated during these periods which tends to twist or lift the carriage from support rod 59. A counterweight 88 is secured to the lamp carriage on the opposite side of the carriage which creates an offsetting but equal torque on the system about the drive shaft. A couple is thus established whereby only axial forces are exerted on the system which are transmitted by the drive shaft to the machine frame where they are readily absorbed.

Because of the novel lamp support and drive arrangement herein disclosed, the lamp carriage is capable of being positively driven through both the scanning phase and the return phase of each copying cycle which permits the lamp carriage to be accelerated and decelerated at rates heretofore unobtainable in this type of scanning apparatus.

Positioned directly below the platen in position to receive a reflected light image of an object or original supported thereon is an optical support generally referred to as 100. The optical system is basically made up of a lens element 18 positioned in a lens carriage 103 and two image mirrors 19 and 20, all of which are supported within a casting 104. The casting is supported by precision surfaces arranged to rest on two horizontal precision tie bars 90 and 91 to accurately seat the casting in a predetermined position within the main machine frame.

Figure 5:
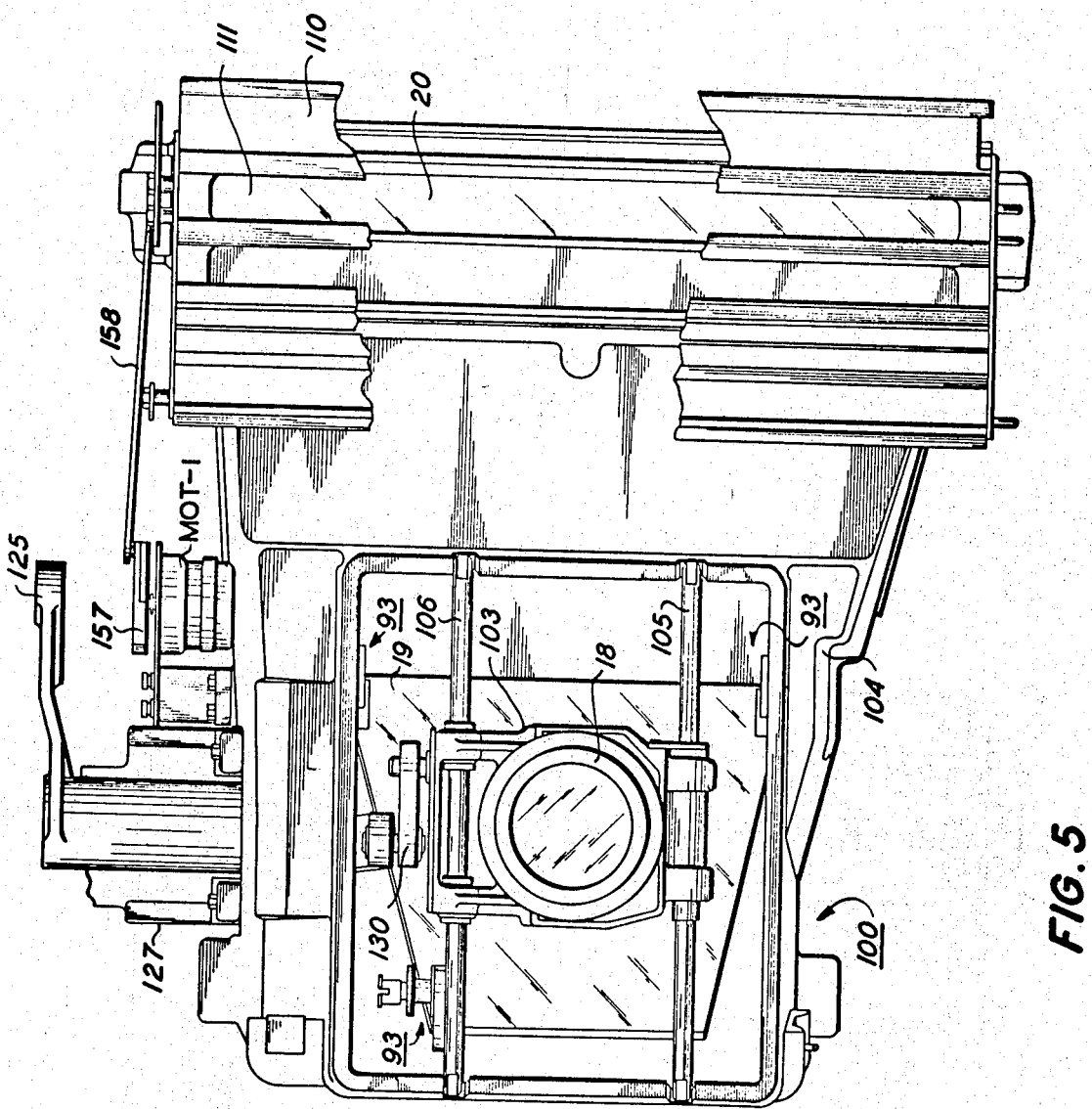
FIG. 5 is a partial section taken along lines 5—5 in FIG. 4 showing the exposure slit and associated shutter mechanism of the present invention.
Figure 11:
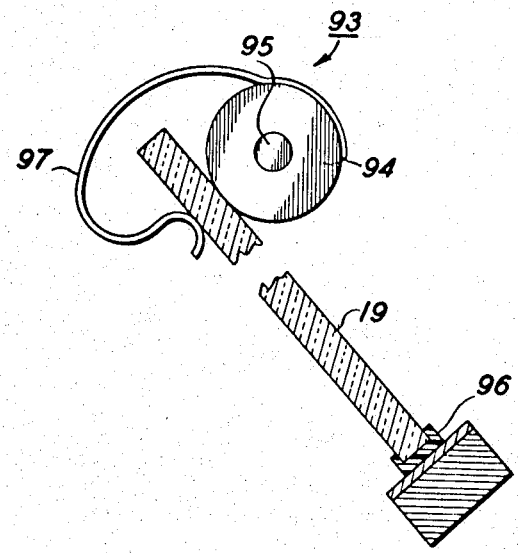
FIG. 11 is a partial view in section illustrating mechanism to support the image mirrors shown in FIG. 2.

The lower edge of each image mirror is carried in a flexible channel 96 (FIG. 11), constructed of an elastomeric or felt material, and the mirrors adjustably supported within the casting at three individual points by means of clip assemblies generally referred to as 93. As illustrated in FIG. 5 and 11, each clip assembly comprises an eccentric cam 94 which is rotatably mounted on a stub shaft 95 anchored in the casting. A spring member 97 is operatively connected at one end to the eccentric cam while the opposite end of the spring is biased into supporting contact with the bottom surface of the reflecting surface. By rotating the cams, the angular position of the individual mirrors in reference to the optical path of the system can be adjusted wherein a light image projected by the system passes through the exposure slit onto the rotating drum surface.

Figure 8:
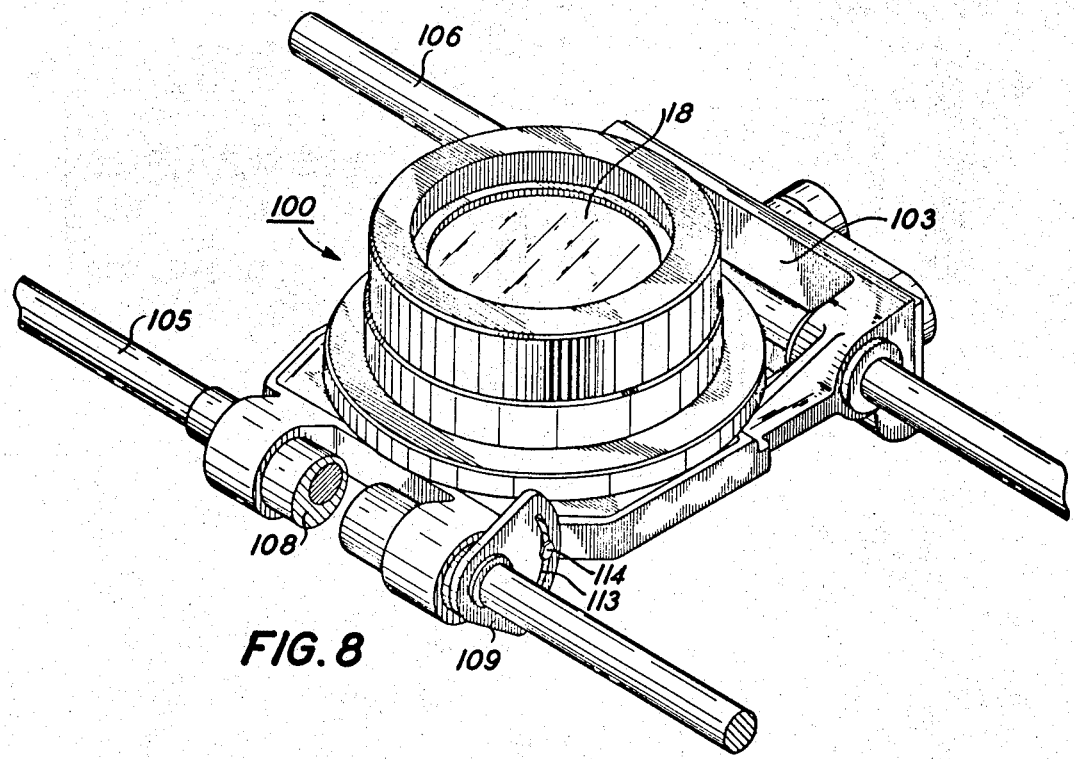
FIG. 8 is a partial perspective view of the lens and lens carriage of the present invention.

Lens element 18 is slidably supported between two parallel horizontal rails 105 and 106 which are anchored in the top part of the optical support casting adjacent to the image receiving opening therein. The lens is mounted in a lens carriage 103 and the carriage, in turn, supported upon the rails in journal bearings provided wherein the carriage moves freely in a plane substantially parallel to the plane of the exposure platen 61. As shown in FIG. 8, one side of the lens carriage is supported upon an eccentric bearing 108 and the eccentric bearing locked to an adjusting arm 109. The adjusting arm is provided with a slotted hole 113. A stud 114 passes through the slotted hole and is threaded into the main portion of the lens carriage housing thus providing a means to lock the eccentric bearing in a predetermined position. A slight horizontal adjustment of the lens is afforded by loosening stud 111 and turning the adjustable arm in the desired direction. A further adjustment of the lens element is provided by eccentric bearing 108. Rotation of the bearing causes the carriage to swing about rail 106 to reposition the optical centerline of the system transversely in reference to the drum surface. By raising or lowering the lens element, the lens can be squared to the object and image planes to obtain optimum image quality.

As illustrated in FIG. 2, the top of the optical support casting is provided with a cap 97 enclosing most of the top opening to the optical casting. The cap has an image receiving aperture 98 therein carrying a bellows-type movable light shield 99. An opening in the movable shield is provided through which the lens element passes in light tight relationship therewith. The remaining portion of the casting is also made light-tight wherein the only light passing interior the casting in the light transmitted by the lens element. In this manner, the sensitive photoconductive surface is protected from being overexposed by ambient light which otherwise might inadvertently enter the system.

At the light exit opening in the optical casting, which is adjacent to the lower drum surface, there is affixed a slotted light shield 110 having an elongated slit or aperture 111 therein arranged to extend transversely across the bottom portion of the drum surface. The shield functions as a field stop to limit the image field striking the drum surface.

Because the photoconductive surface of the xerographic drum is curved, and the drum is in constant motion while the machine is in operation, the image of an original cannot be projected in its entirety directly onto the photoconductive surface. In order to obtain, a clear, well defined, image on the drum surface, the lens element is moved to project continuous images of incremental areas of the copy onto the moving drum surface as it scans across the platen. The movement of the lens is synchronized with the movement of the drumthrough the drive system so that the incremental areas are properly registered successively with each other through the field stop onto the drum to a true reproduction of the copy.

Figure 3:
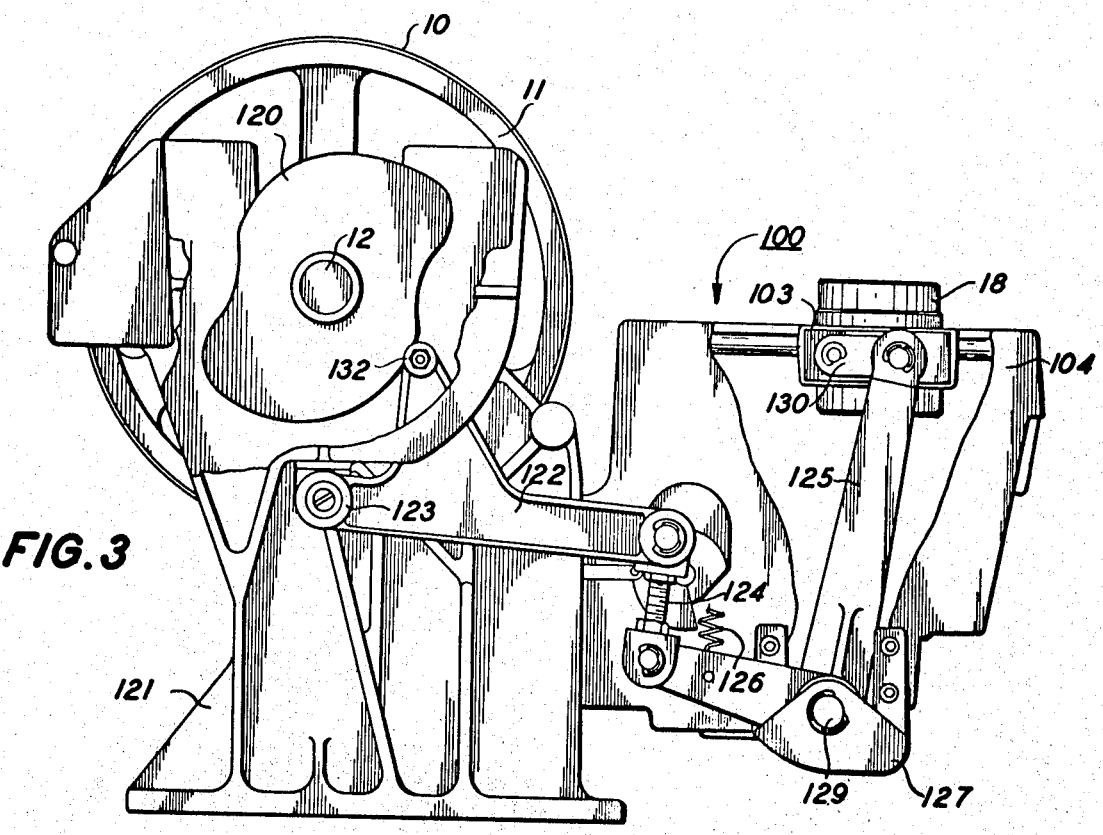
FIG. 3 is a partial side elevation with portions broken away showing the lens drive mechanism of the present apparatus.

To effect uniform illumination of the copy, the light source is moved uniformly across the original as previously described and the motion of the light source coordinatd with the movement of the lens and the movement of the drum surface. This synchornization and coordination of movement of the lens in correlation with the light source and the moving drum surface is obtained by means of a lens control system comprising a drive cam and linkage assembly is driven by a drive mechanism locked to the drum shaft 12. Referring now to FIG. 3, a two lobe cam 120 and the associated drive mechanism is driven from shaft 12 and the assembly mounted in the machine frame upon the drum support casting 121. A cam follower arm 122 is pivotally mounted in the drum casting about a pivot pin 123. The follower arm is operatively connected to one end of rocker arm 125 by means of an adjusting screw 124 and the rocker arm rotatably mounted in the rocker arm support casting 127 mounted to the lower portion of the optical support casting on a shaft 129. The opposite end of the rocker arm is movably connected to the lamp carriage by means of a link 130. In operation, the cam follower 132 is biased into contact with the working surface of the cam by the force exerted on the rocker arm by spring 126 so that the entire prescribed motion of the cam is imparted through the associated mechanism to the lens carriage. The face of each cam lobe is generated so the individual lobes translate a motion to the lens carriage producing a linear scan across the platen and a rapid return to the start of scan position.

The present apparatus is designed to make two copies for each revolution of the drum surface. The cam must therefore reciprocate the lens carriage through two copy cycles for each revolution of the drum surface. However, it should be clear that the present apparatus is perfectly well suited to image the drum surface any number of times per drum revolution and the present apparatus is not limited to this particular two lobe cam arrangement. It should be noted that the lens control cam controls the motion of the lens through both the scan and return of scan passes.

It should be noted that the optical apparatus of the type herein disclosed may be used for the reproduction of the same size of copy or for larger or smaller reproductions. When a one to one reproduction is to be made, the lens is positioned optically equally distant from both the copy and the moving surface of the photoconductive drum. When a smaller or reduced size reproduction is desired, the lens must be positioned optically closer to the xerographic drum than to the copy, and obviously, the opposite arrangement must be made when larger reproductions are desired. In this embodiment disclosed, with the lens positioned mid-point in the optical path between the copy and the xerographic dru, the lens must move through a distance at least one half the length of the copy at a speed equal to one half the linear speed of the surface of the dru, while the light source, which tranverses at least the length of the copy is moved at the samelinear speed as that of the drum surface.

To accomplish the desired scanning cam surfaces of the lens drive system and the cylindrical cam of the lamp drive system are formed so that the cam motions are related and coordinated together to drive the respective systems at the required rates. Themotion of thelens and lamp are further related through the two respective cams systems so that both elements are rapidly returned to their respective start of cam positions and are coordinated wherein the respective elements star forward in unison at the beginning of each scanning pass.

The optical scanning system of the present apparatus, because it is locked to the drum shaft, will be in motion only when the drum surface is moving. In operation, the machine logic will hold the xerographic processing stations in a standby condition when the machine is on. After placing a copy on the copyboard, the desired number of copies is set into the machine select counter and the copy button depressed. At this time, the drum begins to rotate and continues to rotate until the required number of scanning cycles completed. When the select counter reaches coincidence, the machine returns to a standby condition and the drum and optical scanning systems are idled. It is quite conceivable that when the drum is held immobile in one position for a long period of time, the surface of the drum adjacent to the field stop will be continually exposed to ambient light passing through the optical system when the platen cover is in a raised position. As previously noted,prolonged exposure of the drum surface to illumination can seriously effect the drum's photoconductive properties. The highly sensitive drum surfaces will become fatigued after a period of time resulting in a nonuniformity in the quality of copy being produced. An automatic shutter, generally referred to as 140, is provided in the present apparatus which moves into light-tight relation with the light shield to close the field stop opening when the drum surface is not in motion. The shutter basically comprises a substantially flat rigid plate 141 having upwardly rolled edges 142 which ride in slidable, light-tight relationship with a channel 143 (FIG. 0). The channel, in turn, is carried in a pair of vertical support frame 145 (FIG. 9) which is secured to the underside of the light shield 110.

Figure 9:
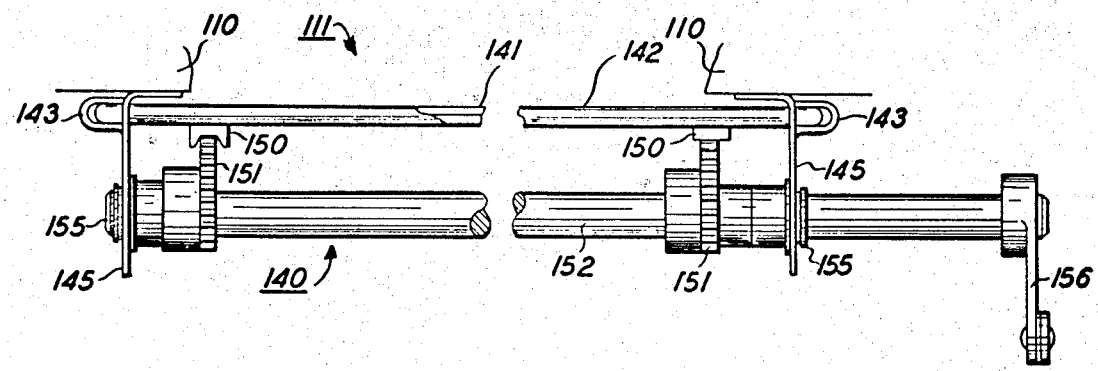
FIG. 9 is a partial front elevation in section of the shutter illustrated in FIG. 7.

A pair of racks 150 are mounted on the bottom surfaces of the shutter with the racis being arranged to engage a pair of segmented pinions 151. A shaft 152 is rotatably carried in the vertical support members 145 in bearing blocks 155 provided. The shaft, securely supports the segmented pinions in spaced relation thereon in a position to operatively engage the racks on the underside of the shutter. The shaft extends beyond the righthand vertical support member as shown in FIG. 9 and has a crank arm 156 secured at the extreme end thereof.

Figure 4:
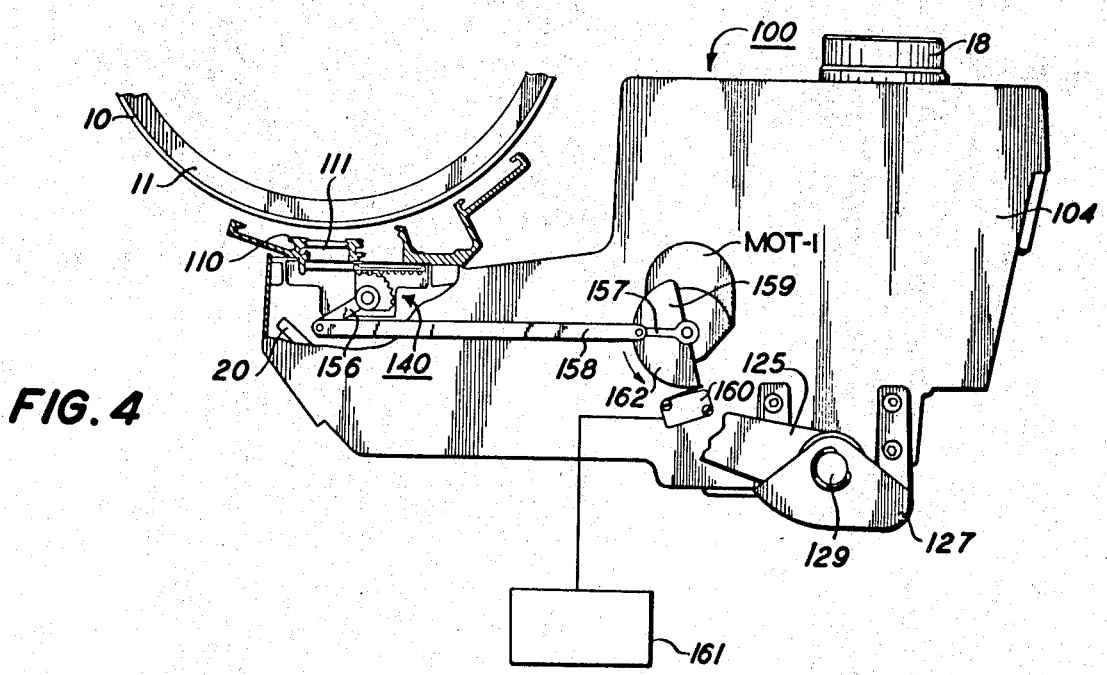
FIG. 4 is a partial side elevation illustrating the shutter slide and the control mechanism associated therewith.

A drive motor MOT-1, mounted in the side of the optical support casting 104 is operatively connected to the shutter crank arm by means of a pair of lins 157 and 158. As the motor shaft rotates through 180°, the shutter is caused to move laterally into light sealing relation with the shield to close the field stop opening. Further rotation of the motor through another 18020 1 causes the connecting linkage to pull the shutter back as illustrated in FIG. 4 to allow light to pass through the field stop onto the drum surface. An actuator arm 159 is also mounted upon the motor shaft and is arranged to hold contact 160 is electrically connected to control unit 161 (FIG. 4) in the machine logic system. When the select counter in the logic system reaches coincidence and the drum stops rotating, an electrical signal is sent to the control unit 161 which activates the motor MOT-1. The motor will continue to rotate in the direction indicated until a change in the condition of the contact 160 is sensed. As can be seen the condition of the contact changes every 180° of shaft rotation so that the shuter is housed in an open or closed relationship with the field stop. That is, once a change of condition signal is received, the shutter will either be moved by the motor to the opposite condition.

While this invention has been described with reference to the structure disclosed herein, it is not confined to the details set forth, and this application is intended to cover such modifications or changes as may come within the scope of the following claims.

What is claimed is:

1. An apparatus for projecting a flowing light image onto a moving light receiving surface of the type wherein a lens element is arranged to focus light reflected from an original through a slit aperture onto the light receiving surface, the lens element scans the original at a rate relative to the light receiving surface to place a flowing light image of the stationary original thereon, wherein the improvement includes:
   a framemember;
   a platen member mounted on said frame member for supporting the original, said platen member having one side edge thereof unsupported by said frame member and suspended thereover;
   an elongated lamp positioned adjacent said platen member with the longitudinal axis of said lamp being substantially parallel to said platen member, said lamp being substantially opaque and having a light ransmitting portion extending lingitudinally across the surface thereof, said lamp being arranged so that the light transmitting portion directs an incremental band of illumination forwardo of said lamp in the direction of the unsupported side edge of said platen member; and
   means for moving said lamp in a time relation with the lens to focus successive incremental bands of illumination, said moving means advancing said lamp in a direction substantially transverse to the longitudinal axis of said lamp and substantially parallel to said platen member toward the unsupported side edge of said platen member.

2. An apparatus as recited in claim 1, wherein said movingmeans includes a rotary driven, substantially cylindrical cam member arranged to advance said lamp and lens element during the scanning pass and to return said lamp and lens element to respective start of scan positions after each scanning pass at a rate in excess of the advancing rate.

3. An apparatus as recited in claim 2, further including:
   first switch means affixed to said frame member and arranged to energize said lamp member at the satart of the scanning pass; and
   second switch means affixed to said frame member and arranged to de-energize said lamp member at the end of the scanning pass, said lamp being de-energized during the return to the start of scan position.

\* \* \* \* \*